US006956933B2

(12) United States Patent
Virag et al.

(10) Patent No.: US 6,956,933 B2
(45) Date of Patent: Oct. 18, 2005

(54) DIRECTORY DELIVERY SYSTEM AND METHOD FOR A DIGITAL SUBSCRIBER LINE MODEM

(75) Inventors: David Emery Virag, Indianapolis, IN (US); Kumar Ramaswamy, Plainsboro, NJ (US); John William Richardson, Hamilton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 140 days.

(21) Appl. No.: 10/044,260

(22) Filed: Jan. 11, 2002

(65) Prior Publication Data

US 2003/0133549 A1 Jul. 17, 2003

(51) Int. Cl.[7] .................................. H04M 11/00
(52) U.S. Cl. ..................... 379/93.25; 379/88.14; 379/88.11
(58) Field of Search .................. 379/93.25, 93.23, 379/93.01, 93.05–93.08, 93.12, 93.14, 93.17–93.19, 90.01, 110.01, 88.01, 88.03, 88.11–88.14, 88.17, 218.01, 216.01, 354; 370/352, 537; 704/270.1, 275

(56) References Cited

U.S. PATENT DOCUMENTS

| | | | | |
|---|---|---|---|---|
| 5,457,738 A | * | 10/1995 | Sylvan | 379/93.19 |
| 5,524,141 A | * | 6/1996 | Braun et al. | 379/93.25 |
| 5,838,775 A | * | 11/1998 | Montalbano | 379/93.23 |
| 5,948,474 A | * | 9/1999 | Tiller et al. | 379/110.01 |
| 5,949,474 A | * | 9/1999 | Gerszberg et al. | 379/110.01 |
| 6,052,439 A | * | 4/2000 | Gerszberg et al. | 379/88.01 |
| 6,104,789 A | * | 8/2000 | Lund | 379/93.23 |
| 6,269,337 B1 | * | 7/2001 | Desmond et al. | 704/270.1 |
| 6,292,210 B1 | * | 9/2001 | Gerszberg et al. | 348/14.01 |
| 6,424,646 B1 | * | 7/2002 | Gerszberg et al. | 370/352 |
| 6,504,925 B1 | * | 1/2003 | Schlachman et al. | 379/354 |
| 6,603,839 B1 | * | 8/2003 | Smith et al. | 379/93.23 |

OTHER PUBLICATIONS

Webster's II New Riverside University Dictionary, copyright 1994 by Houghton Mifflin Company, pp. 697, 976.*

* cited by examiner

Primary Examiner—Wing Chan
(74) Attorney, Agent, or Firm—Joseph S. Tripoli; Joseph J. Laks; Joseph J. Kolodka

(57) ABSTRACT

A telecommunication system and method are disclosed for employing a directory service or voicemail retrieval service over a telecommunication network. The telecommunication system includes a telecommunication device having a display for viewing textual information, the telecommunication device being connected to a digital subscriber line (DSL) telephone network. A database application includes directory information, and the database application is remotely disposed relative to the telecommunication device. A mechanism is coupled to the telecommunication device such that when the mechanism is activated, a user is provided with access, through the DSL network, to directory information on the data base application. The directory information is provided to the display of the telecommunication device in response to user entered information.

13 Claims, 4 Drawing Sheets

DIRECTORY DELIVERY SYSTEM AND METHOD FOR A DIGITAL SUBSCRIBER LINE MODEM

FIELD OF THE INVENTION

The present invention generally relates to network communications and, more particularly, to a method and system for delivering directory and other business information to a feature telephone at a customer premises or office using a Digital Subscriber Line (DSL) modem.

BACKGROUND OF THE INVENTION

Traditional telephone systems are composed of receiver-transmitter handsets and limited keypads enabling a user to make a simple 7 or 10 digit number entry for the purposes of contacting a desired recipient at another location. The handsets typically include a sound transducer for the purpose of converting voice into an electrical signal and electrical signals to voice. The voice signals are carried in analog format over copper twisted pair wires to a central office for eventual connection with the remote receiver. For these systems, if a user desires to find telephone number information for a person or business, the user may look through the printed directory listings (White Pages or Yellow Pages) provided by the local phone company or phone an operator and ask information directly using the analog voice channel.

These services require access to printed phone directories or calls to an operator, which sometimes do not provide the needed information and tend to be relatively expensive since a premium is charged for the directory call. It would be advantageous to be able to provide a system and method, which provides directory services directly to a telephone for use by a user. Automated mechanisms to deliver directory services exist today in analog systems employing dial-up modems. For example, the MINITEL™ system used in France provides a directory service on an analog system.

Therefore, a need exists for a system and method for delivering directory device over a digital signal line network.

SUMMARY OF THE INVENTION

A telecommunication system and method are disclosed for employing a directory service over a telecommunication network. The telecommunication system includes a telecommunication device having a display for viewing textual information, the telecommunication device being connected to a digital subscriber line (DSL) telephone network. A database application includes directory information, and the database application is remotely disposed relative to the telecommunication device. A mechanism is coupled to the telecommunication device such that when the mechanism is activated, a user is provided with access, through the DSL network, to directory information on the data base application. The directory information is provided to the display of the telecommunication device in response to user-entered information.

The telecommunication system described above may include a telecommunication device being remotely disposed relative to a voicemail server located within the DSL network. The voicemail server includes an answering device coupled to the DSL network for receiving and recording messages of the telecommunication device over the DSL network. A user is provided with access, through the DSL network, to the messages stored on the voicemail server, and the messages are textually rendered and provided to the display of the telecommunication device. Means for selecting an entry from a message listing to retrieve the message is also included.

Another telecommunication system and method are disclosed for employing a voicemail retrieval service over a telecommunication network. A telecommunication device having a display for viewing textual information is included. The telecommunication device is connected to a digital subscriber line (DSL) network and remotely disposed relative to a voicemail server located within the DSL network. The voicemail server includes an answering device coupled to the DSL network for receiving and recording messages of the telecommunication device over the DSL network. A mechanism is coupled to the telecommunication device such that when the mechanism is activated, a user is provided with access, through the DSL network, to the messages stored on the voicemail server. The messages are textually rendered and provided to the display of the telecommunication device. A selector mechanism is provided for selecting an entry from a message listing to retrieve the message.

A method for providing textual directory services to an end-user through a DSL telecommunication network, in accordance with the present invention includes initiating communication with a database application disposed in a telecommunications network from a remotely disposed telecommunication device. The telecommunication device has a display. Directory categories are selected by entering keyed-in information from the telecommunication device and at least one directory entry is received in accordance with the keyed-in information on the display of the telecommunication device.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention includes a system and method for acquiring information for the purposes of contacting a person or business by using a database directly accessible by the communication device or system (e.g., a telephone). In one embodiment, for example, a computer application resides at some remote location (e.g., a central office), which communicates with an advanced telephone for the purposes of providing directory listing or business contact information at the telephone itself. This system may be provided to users on a per usage basis or for a regular service fee, for example, a monthly service fee. The service may be provided under different plans or be customized to particular business needs. Preferred embodiments include methods to deliver service information through an always-on digital network. The delivery of information services is preferably performed through private means over a DSL network.

It should be understood that the elements shown in the FIGS. may be implemented in various forms of hardware, software or combinations thereof. Preferably, these elements are implemented in hardware on one or more appropriately programmed general-purpose devices, which may include a processor, memory and input/output interfaces. Although the present disclosure teaches the use of an advanced telephone, other telecommunication devices may be employed as well. For example, personal digital assistants (PDAs), cellular phones, lap tops or any other communication device having a display may be employed in accordance with the present invention.

Figure 1:
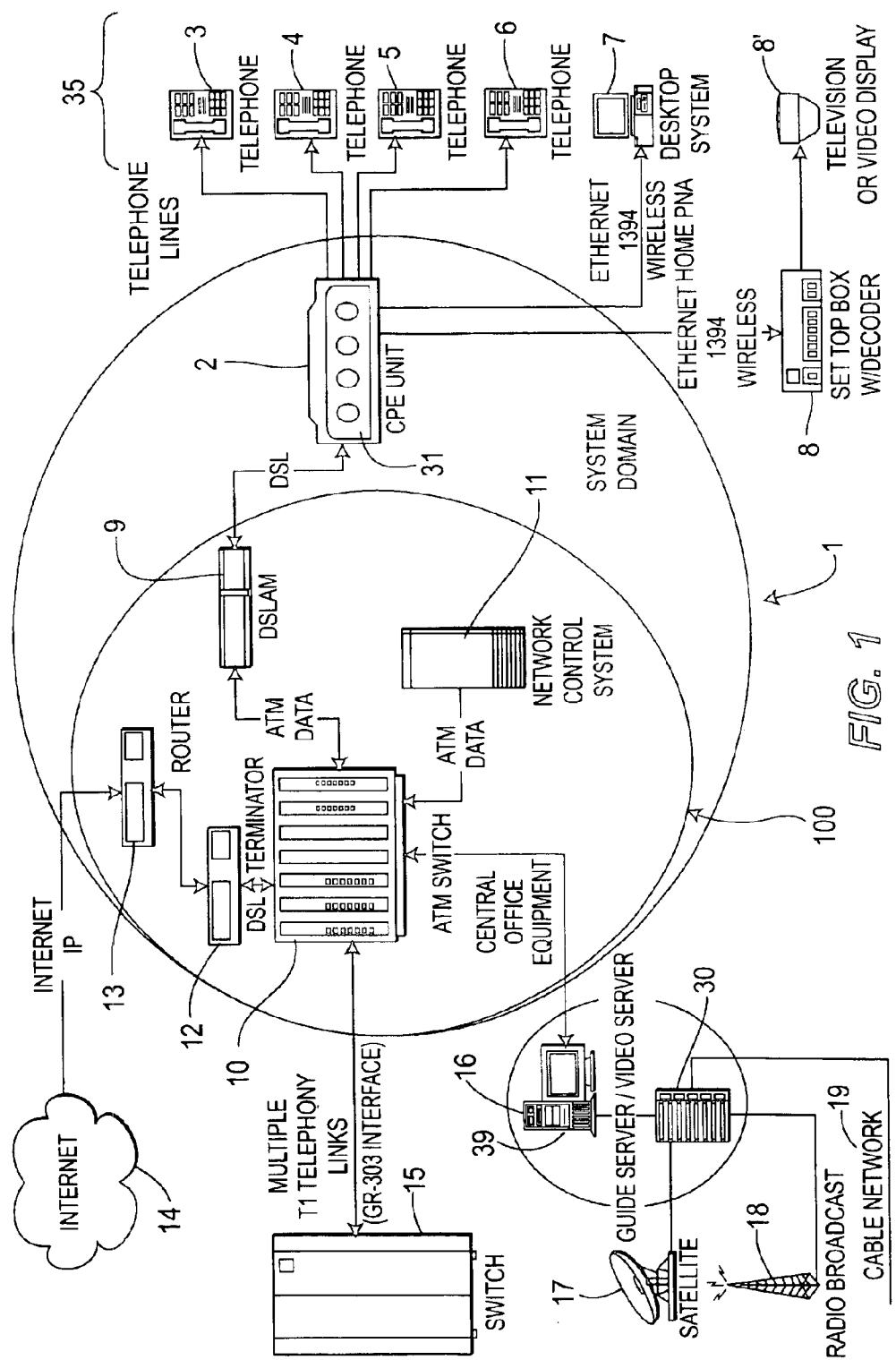
FIG. 1 is a block diagram of a digital subscriber line (DSL) system architecture having a database application capable of offering directory services to an end user in accordance with the present invention.

Referring now in specific detail to the drawings in which like reference numerals identify similar or identical elements throughout the several views, and initially to FIG. 1, a schematic block diagram is shown for a digital subscriber line architecture system 1. System architecture 1 is presented as an exemplary DSL environment for employing the inventive method and apparatus in accordance with the present invention. Details of the individual block components making up the system architecture are known to skilled artisans, and will only be described in details sufficient for an understanding of the present invention. The system block diagram 1 is composed of several functional blocks. The system domain is composed of Central Office (CO) Equipment 100 and Customer Premise Equipment (CPE) 2. The component blocks within the system domain and their respective interfaces are: customer premise equipment (CPE), Digital Subscriber Line Access Multiplexer (DSLAM) 9, an ATM switch 10, an Internet protocol (IP) router 13 and ATM/DSL terminator 12, and a network control system (NCS) 11.

One illustrative set-up for customer premise equipment (CPE) 2 includes, for example, a DSL modem unit 31 that interfaces with analog telephones (for example, analog telephones 3, 4, 5 and 6) employing plain old telephone service (POTS), a 10Base-T Ethernet connection to a PC desktop system 7, and an Ethernet or RS-422 connection to a set-top box with a decoder 8 for connection to, for example, a television or video display 8'. From the customer's analog end, the CPE device 2 accepts the analog input from each of the telephones 3–6 converts the analog input to digital data, and packages the data into ATM packets (POTS over ATM), with each connection having a unique virtual channel identifier/virtual path identifier (VPI/VCI). Known to skilled artisans, an ATM is a connection-oriented protocol and as such there is a connection identifier in every cell header, which explicitly associates a cell with a given virtual channel on a physical link. The connection identifier includes two sub-fields, the virtual channel identifier (VCI) and the virtual path identifier (VPI). Together these identifiers are used for multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem to be modulated and delivered to the DSLAM unit 9.

The DSL signal is received and demodulated by a DSL modem 31 in the customer premise equipment 2 and delivered to VPI/VCI detection processing. The ATM cell data with VPI/VCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

The Digital Subscriber Line Access Multiplexer DSLAM 9 demodulates data from multiple DSL modems and concentrates the data onto the ATM backbone network for connection to the rest of the network. That DSLAM provides back-haul services for package, cell, and/or circuit based applications through concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 100, the ATM switch provides for the cell routing and buffering in connection to the DSLAM, network control system 11 and the Internet gateway (Internet Protocol IP router 13 and DSL terminator 12), and T1 circuit emulation support in connection with the multiple telephony links switch 15. A T1 circuit provides, for example, 24 voice channels packed into a 193 bit frame transmitted at 8000 frames per second. The total bit rate is e.g., 1.544 Mbps. The unframed version, or payload, includes 192 bit frames for a total rate of e.g., 1.536 Mbps.

The ATM switch 10 is shown coupled to a program guide server/video server 16 to satellite 17, radio broadcast 18 or cable 19 networks. The ATM switch 10 is also coupled over the DSL terminator 12 and IP router 13 pair to receive Internet Protocol IP packet data from the Internet 14.

The network control system (NCS) 11 provides for address translation, demand assignment and call management functions. The Network Control System's principle function is to manage the DSL/ATM network including the origination and termination of phone calls. The NCS is essentially the control entity communicating and translating control information between a class 5 PSTN switch (using the GR-303 protocol) and the CPE. The network control system 11 is available for other functions such as downloading code to the CPE, and bandwidth and call management (e.g., busy) functions, as well as other service provisioning and set up tasks.

In the case of digital telephony, central office 100 is equipped with necessary equipment to transmit voice data in digital format to a residential or business customer 35. DSL is widely recognized as one mechanism for achieving this and may be employed in accordance with the present invention. For the customer, in the case of DSL, a DSL modem 31 interprets the information from central office 100 and, in one case, can reformat the information into an analog signal transmitted to a traditional analog telephone.

If the customer has a digital phone, reformatting of the information into analog is not necessary. For the purposes of this illustration, a digital phone 3 (4, 5, or 6) receives a digital signal on lines 24 and provides the necessary processing to generate an audible signal to the user in the case of receiving, or in the case of transmitting, encodes an audio signal into a digital stream for transmission to DSL modem 31. Lines 24 preferably carry ATM cells broken down into channels. These channels may include both voice and data channels.

It is therefore noted that the digital telephone link is composed of separate voice channels and data channels. Only voice information is carried in the voice channel. Information can be transferred in any one of a plurality of modes which can be handled by the system, for example, time division multiplexing access (TDMA), frequency division multiplexing access (FDMA) or any other mode may be employed. Notwithstanding the mode, the control system and software of the present invention sort out the channels. The data channel may carry control information or general-purpose data transmissions. System 1 also includes a database application 30. This database application 30 may be located at central office 100 or other appropriate places such that it is easily accessible through data networks. The database application 30 includes information on residential and business numeric listings and any additional information of interest relating to directory listings. In one embodiment, database application 30 is included in program guide server/video server/voicemail server 16. Voice mail server 16 includes an answering device 39, preferably implemented in software, to interface with callers to leave messages and retrieve messages.

Database application 30 may be queried directly from a remote device such as, for example, a home telephone. This bypasses the need for human operators or other machine intervention.

Digital Subscriber Line Access Multiplexer (DSLAM) 9 works in conjunction with ATM switching to perform various functions in the network, including cell transport, multiplexing and concentration, traffic control and ATM-layer management. The ATM switching provides for the cell routing and buffering in connection with the DSLAM 9.

Figure 2:
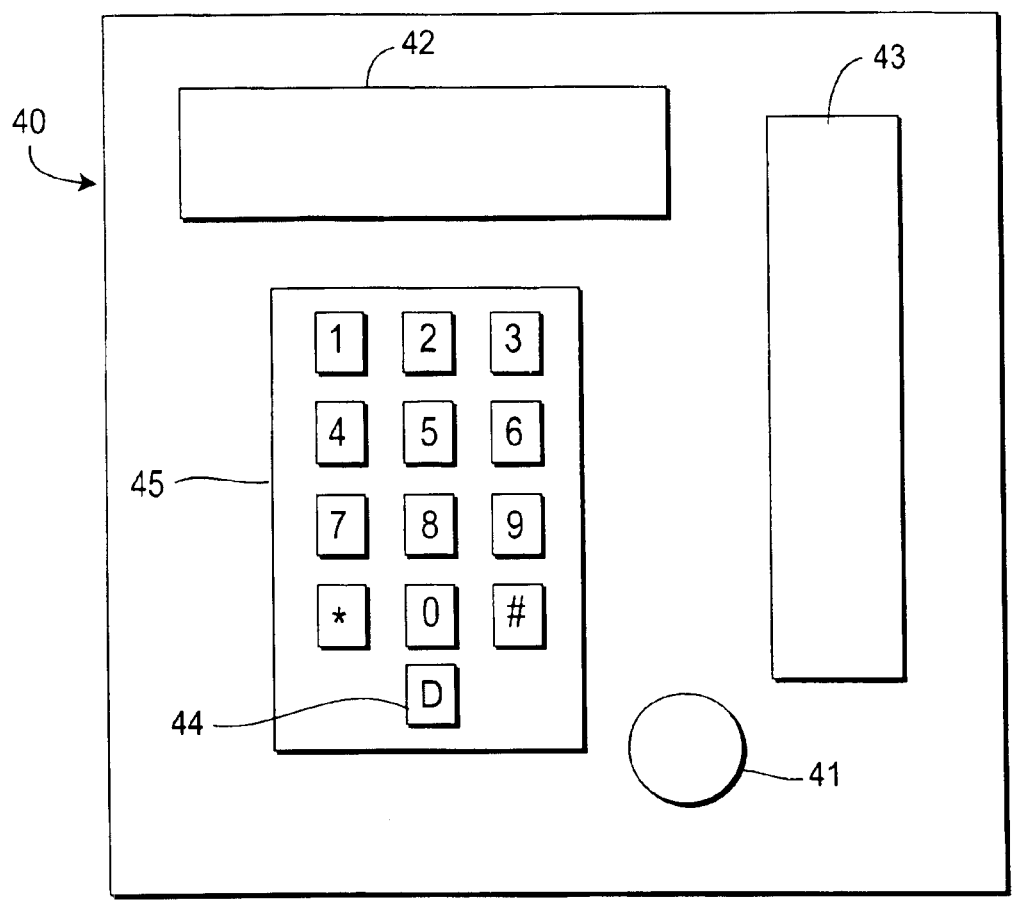
FIG. 2 is a schematic diagram of an illustrative telephone device capable of providing directory service in accordance with the present invention.

Referring to FIG. 2, an advanced phone 40 (connected as shown for telephones 3–6 in FIG. 1) may be employed to call up a directory function from central office 100 (FIG. 1), or from a local database at a private branch exchange (PBX) or other local database. Advanced phone 40 in accordance with one embodiment of the present invention may include an LCD or other display 42 for the purposes of displaying information retrieved from a directory. Displays on phones are common today for the purposes of recalling stored numbers, previously dialed numbers, or called-ID features. Phone 40 includes a receiver 43 and may include other features, such as a speaker, etc. Phone 40 includes a numeric keypad 45 for the purposes of dialing numbers for eventual connections. Most phones have a keypad [0]–[9] digits, "*" and "#", with some additional keys for storing and recalling frequently called numbers. For guide services, a phone may have an additional key 44.

In this case, an extra button 44 provides a dedicated mechanism to request information. This button 44 may be pressed whether the phone is off-hook or on-hook. Pressing button 44 sends a signal through the digital network to the database application 30 (FIG. 1). Database application 30 may then respond with an appropriate prompt for more information using LCD display 42 of telephone 40. The requestor may then answer the prompt using the numeric keypads (with the capability for indicating letters as well) to enter desired information. In one embodiment, a data channel is employed to provide directory information. In this way, simultaneous use of the voice service and the directory service is possible. Alternately, an additional voice channel (i.e., two voice channels) may be employed to provide the directory service simultaneously with voice service.

Prompts and responses may be navigated through a menu or menus of items. For example, a customer chooses to find a pizza delivery service for the local area. Button 44 is pressed and a prompt such as 'Press 1 for advertisers', 'Press 2 for listings' is displayed on display 42. If the customer presses "1", a second prompt indicating, for example, 'Category' is shown, for which the customer replies with 'Pizza' by typing on the keypad. Methods exist for entering textual information into a numeric keypad. For example, 'P' could be represented by the numeric sequence 7, 1, meaning the 7 key includes the characters PQRS and P is the first character of the available characters. Similarly, 'i' could be represented by the sequence 4, 3, etc. Instead of a telephone, the directory service in accordance with the present invention may be implemented using, for example, a personal digital assistant connected to a network by a wired or a wireless connection. In addition, a personal computer having a DSL modem and a voice headset or microphone/speakers may be employed.

Figure 3:
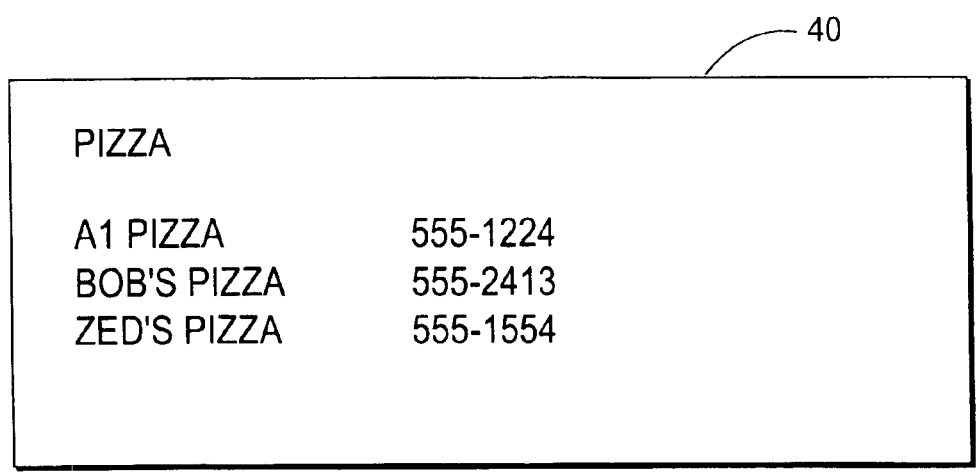
FIG. 3 is an illustrative display for the telephone device of FIG. 2 in accordance with the present invention.

Once the information has been entered by the customer, the database application 30 returns with the appropriate listings with phone numbers and/or other fields of information, which may be useful to the customer. FIG. 3 shows an illustrative display 42 indicating several directory listings, which satisfy a query of the customer.

Figure 4:
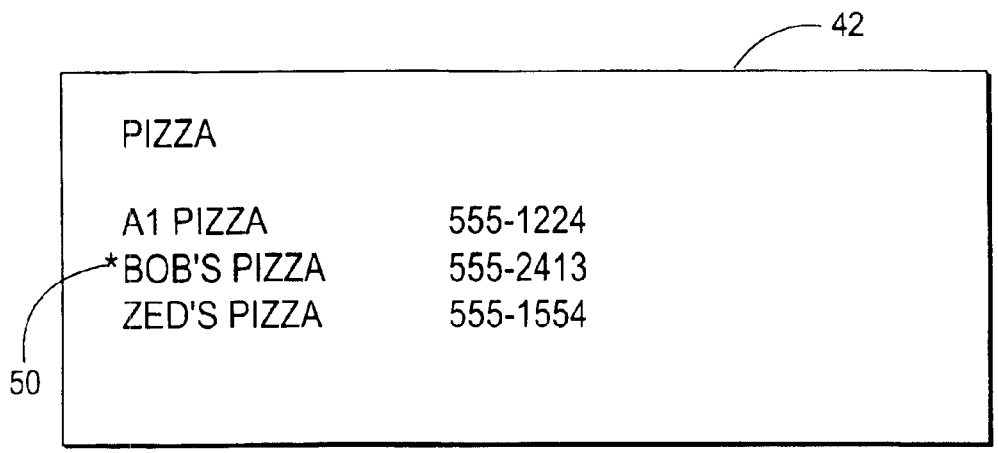
FIG. 4 is an illustrative display for the telephone device of FIG. 3 showing a selector or cursor to designate an entry in accordance with the present invention.

Referring to FIG. 4, an identifier, a cursor, a selector 50 or other indicator is provided (as represented in FIG. 4 by an asterisk). The user may use a thumbwheel, phone keys or other mechanism 41 (FIG. 2) on phone 40 to move the selector up or down to select the desired entry before going off-hook for a voice connection to be established. The user could alternatively go off-hook and manually dial in the digits to reach the desired party. A more advanced display could include more information such as a data address for gathering more information on the party of interest (e.g., a URL) or an actual address of the entity listed in the directory. After the user scrolls through the listing, a call to an entry on the list may be made by pressing a key on the phone, for example, key 44. In this way a call is placed directly to the entry selected as indicated by cursor 50. Technology similar to a redial function may be employed to place the call. Placing the call through this service may be charged and billed to the user on a per call basis or a flat monthly fee, for example. Key 44 preferably provides an always-on access to database application 30 for directory services. Advantageously, the directory service can be employed while the phone is off-hook and while a call is in progress. The directory services provided in accordance with the present invention may be provided while the telephone is on-hook. The DSL can handle multiple voice calls so that if another call is in progress, a user can still dial out for directory services in accordance with the present invention using a second voice channel.

There are many advantages to using a remote database application connected through the phone-line to provide directory listings or commercial advertising information. For example, there is no need for the user to manually lookup information in a set of books. In addition, the database application has information including the location of the requesting user. Location information may be utilized to filter the results of a search to correspond to close proximity to the requestor. The directory service provider may also prioritize the listings of the search results in accordance with preferred partners. For example, entities, which pay for a higher listing priority, may be displayed in bold or at the top of the listing. Other information of importance to the user may be conveniently conveyed through this mechanism. For example, the application may only provide listings of those businesses that are currently open. A graphical display could provide the operation hours of the listee or simply omit any listee that is closed. There may be additional information provided by the requester to more accurately locate the desired person or business. An example may be a zip-code. Furthermore, a user may be able to pose queries to the system to conduct a search of listings. For example, a new listing search under the category of restaurant may provide restaurant names, which are newly listed in the directory, say, listed for less than a year. Other search categories are also contemplated.

Queries may be posed by selecting keys on a remote device, such as a telephone, or by a sound to electrical transducer (e.g., sound pickup) with voice recognition. For example, voice to text translation may be performed at the remote device (e.g., telephone 40) or be processed by an application at the central office 100.

Figure 5:
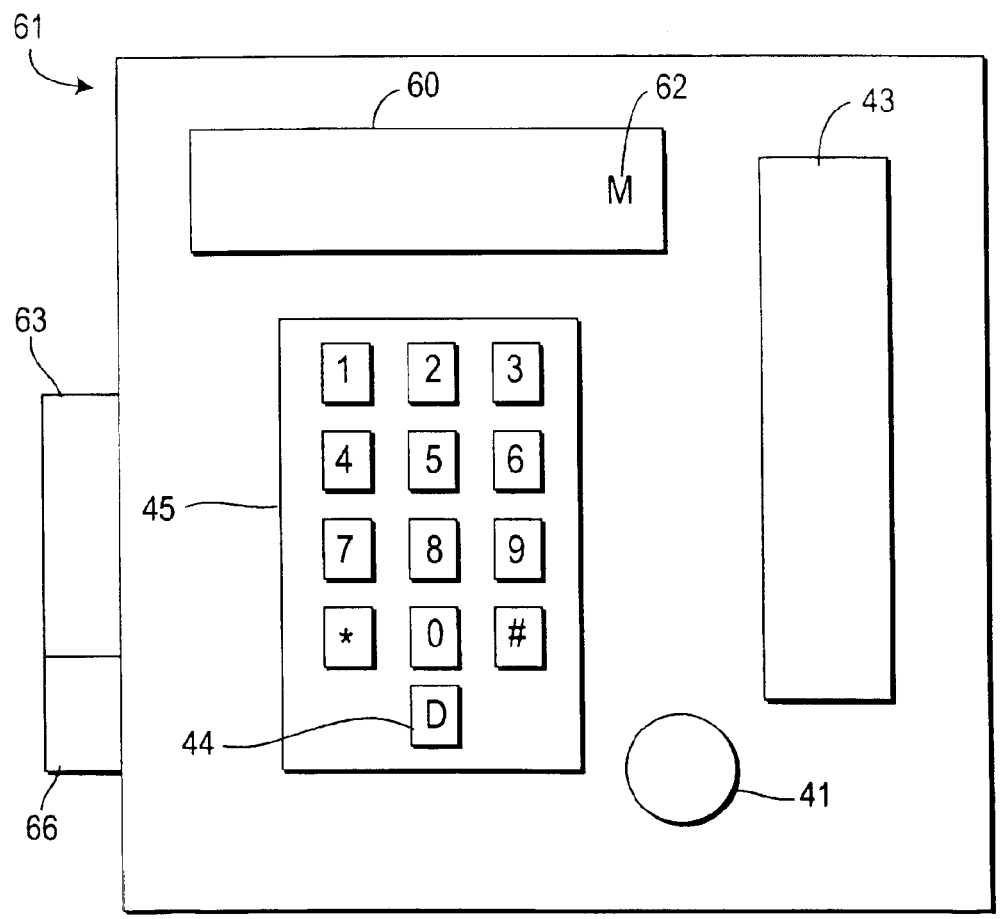
FIG. 5 is a schematic diagram of an illustrative telephone device capable of providing message services in accordance with the present invention.
Figure 6:
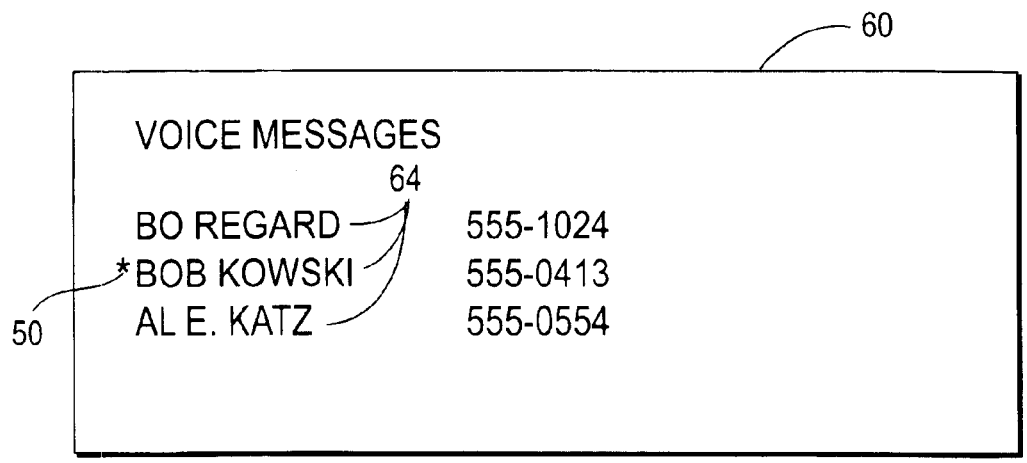
FIG. 6 is an illustrative display for the telephone device of FIG. 5 showing a selector or cursor to designate a message entry in accordance with the present invention.

In an alternate embodiment, an advanced telephone user interface is employed for voice mail. Referring to FIGS. 5 and 6, in the case of voice mail, display screen 60 may have an icon 62 appear that signals one or more voice mail messages are available. In one embodiment, an answering device 63 may be coupled directly to the telecommunication device 61 for receiving and recording messages of the telecommunication device 61. In another embodiment, server 16 (FIG. 1) includes a voicemail server, which receives and records message through a DSL network. The embodiment employing voicemail server 16 works in much the same way as the directory services application described herein. A mechanism 66 converts message information so that the message information can be displayed as a received-message listing on the display for messages, which are left on the answering device. Mechanism 66 may include any known device capable of retrieving information from a phone circuit and displaying the information textually. In alternate embodiments, the information may be textually generated by recognizing speech from with the message content itself and displaying the content recognized on the display of the telecommunication device (for example, the first several words or the first noun spoken, etc.). Known speech recognition algorithms may be employed. Other algorithms may perform speech-to-text conversion as well. For example, mechanism 66 may include a speech-to-text conversion algorithm for displaying the information textually after processing the voicemail message through the conversion algorithm.

The user may use selection mechanism 41 (e.g. push button 44 or activate a thumb wheel or other device) to move a cursor or indicator next to an entry (message). A selection becomes available on display screen 60 for the user to enter voice mail by pressing a key. When the user enters voice mail, the advanced user interface may list all the voice mail messages 64 in a mailbox on display screen 60. The list preferably includes the caller phone number, the caller name, time and date of call, or other data, which may be collected during the connection of a phone circuit (for example, the length of the message). Additionally, other information may be listed, for example, if the caller hung up before leaving a message.

Using display 60 and selection mechanism 41, the user may then review all mail messages in order or selectively choose which messages to listen to. The user may also redisplay the messages in a new ordering such as alphabetically, by time called, numerically by calling number or some other algorithm. When a selection is made, the voice is played back to the user through the data circuit.

Advantageously, the present invention permits the voice channel to be open during any data inquiries, including the control and listening of voice mail. This has the advantage of allowing incoming calls while user is scanning directory information, reviewing voice messages, or using other applications. In one embodiment, a data channel is employed to provide voicemail message retrieval. In this way, simultaneous use of voice (e.g., phone is off-hook and/or call is in progress while voicemail is retrieved) and the voicemail retrieval. Alternately, an additional voice channel may be employed to provide the voicemail retrieval service simultaneously with voice service.

The end telephone to support the features of the present invention may be digital or analog. If the phone is digital, the digital bi-directional interconnect between the telephone, DSL modem, and Central Office is direct. If the telephone is analog, the digital information transmitted and received between the DSL modem and the analog phone must be modulated above the bandwidth of the voice. The analog telephone must have an additional modem therein to receive the information modulated above the bandwidth of voice. In this case, the transmission of digital information between the DSL modem and Central Office is identical to the former case.

Figure 7:
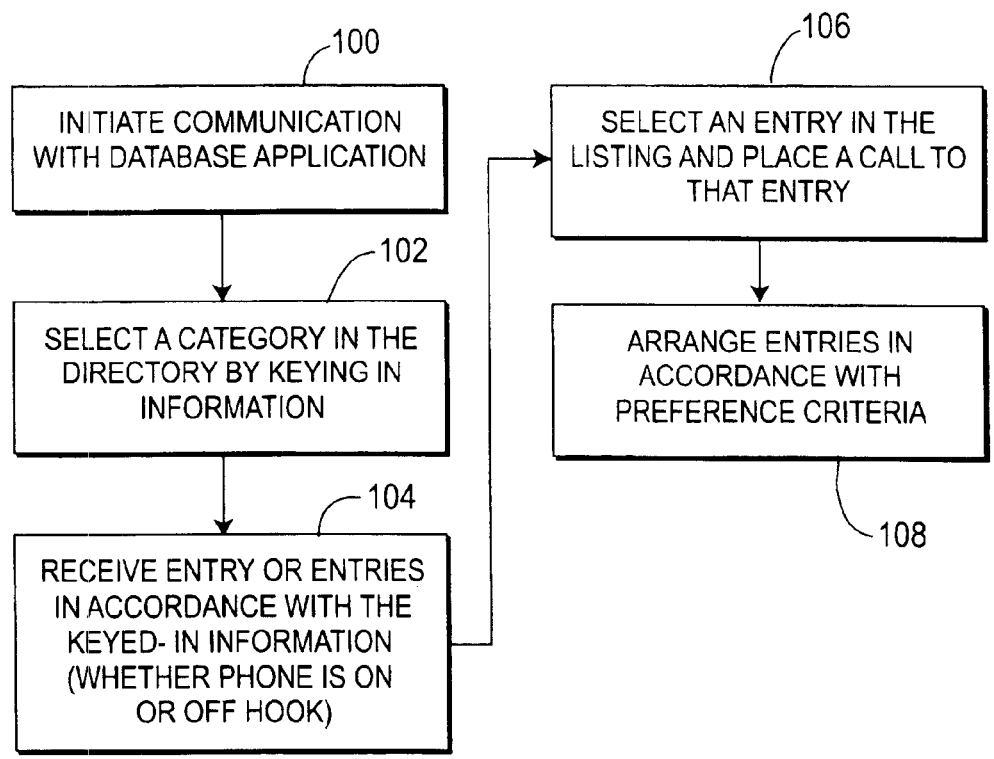
FIG. 7 is a block/flow diagram showing an illustrative method for requesting and receiving directory services in accordance with the present invention.

Referring to FIG. 7, a method for providing textual directory services to an end-user through a telecommunication network is shown in accordance with one embodiment of the present invention. In block 100, the user initiates communication with a database application 30 (FIG. 1) disposed in a telecommunications network. Application 30 is preferably disposed remotely from the telecommunication device. The telecommunication device has a display capable of displaying textual information. The telecommunication device preferably includes an advanced telephone, although PDA's and similar devices are also contemplated. In block 102, directory categories are selected by keying in information from the telecommunication device by the user. The keying-in of information is performed in accordance with prompts or queries generated on the display of the telecommunication device as generated by the database application. In block 104, at least one directory entry is received in accordance with the keyed-in information and is displayed on the display of the telecommunication device. Preferably, a listing of entries, which comply with the user's requested information, is generated and displayed as described above.

In block 106, an entry from the list of entries may be selected by employing a cursor and a mechanism, such as a thumbwheel or telephone key, to scroll through the listing. Once the listing is selected a call may be initiated to that entry by hitting a key or performing some other affirmative act. These steps may be performed while the telephone is on-hook or off-hook. Alternately, in block 108, the entries returned from database application may be arranged, ordered or selected prior to being sent to the end-user device. For example, only business entries, which have business hours at the time of the request, may be displayed. The business entries may be ordered according to preference criteria and presented to a user in accordance with the preference criteria. The preference criteria may list businesses, which have paid additional amounts of money for a priority listing, or are partners with the service provider of the directory service, etc. Other preference criteria are also contemplated.

Having described preferred embodiments for directory delivery system and method for a digital subscriber line modem (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A telecommunication system, comprising:
   a device for displaying viewable textual information and coupled to a digital subscriber line (DSL) network;
   a database application which includes directory information, the database application being remote from the device for displaying; and
   a mechanism coupled to the device and when activated, provides a user with access to the directory information, the directory information being displayed through the DSL network to the device responsive to the user, said device for displaying being remote over the DSL network from a voicemail server located within the DSL network, the voicemail server including an answering device coupled to the DSL network for storing messages of the device for displaying; and
   means for the user selecting an entry from a message listing to retrieve a message stored on the voice mail server, the messages being textually rendered and provided to the device for displaying.

2. The telecommunication system as recited in claim 1, wherein the mechanism includes a button on the keypad of a telephone.

3. The telecommunication system as recited in claim 1, wherein the button on the keypad of the telephone is dedicated only to initiating communications with the database application.

4. The telecommunication system as recited in claim 1, wherein the database application is located at a central office in the DSL network.

5. The telecommunication system as recited in claim 1, wherein the directory information includes a plurality of entries and the system further comprises means for selecting an entry from the list of entries to initiate a telephone call to that entry.

6. The telecommunication system as recited in claim 1, wherein the directory information includes information about business hours for an entry.

7. The telecommunication system as recited in claim 1, wherein the directory information includes information arranged in accordance with a priority for entries in the database application.

8. The telecommunication system as recited in claim 1, wherein the database application is configured to simultaneously provide information to the device during a telephone call from the device.

9. The telecommunication system as recited in claim 1, wherein the database application is configured to provide information to the device while the device is on-hook.

10. A telecommunication system comprising:
    a telecommunication device having a display for viewing textual information, the telecommunication device being connected to a digital subscriber line (DSL) telephone network said telecommunication device being remotely disposed relative to a voicemail server located within the DSL network; the voicemail server including an answering device coupled to the DSL network for receiving and recording messages of the telecommunication device over the DSL network;
    a database application which includes directory information, the database application being remotely disposed relative to the telecommunication device;
    a mechanism coupled to the telecommunication device such that when the mechanism is activated, a user is provided with access, through the DSL network, to directory information on the data base application, the directory information being provided to the display of the telecommunication device in response to user entered text information, said user being provided with access, through the DSL network, to the messages stored on the voicemail server, the messages being textually rendered and provided to the display of the telecommunication device; and
    means for selecting an entry from a message listing to retrieve the message.

11. The telecommunication system as recited in claim 10, wherein means for selecting includes a control device on a telephone.

12. The telecommunication system as recited in claim 10, wherein the telecommunication system permits message retrieval while the telephone is on-hook or off-hook.

13. The telecommunication system as recited in claim 10, wherein the telecommunication system employs at least one voice channel and at least one data channel and the telecommunication system is configured to provide voicemail message retrieval on the telecommunications device through a data channel simultaneously while a call is in progress on a voice channel on the telecommunications device.

* * * * *